(12) United States Patent
Greene et al.

(10) Patent No.: US 6,792,646 B1
(45) Date of Patent: Sep. 21, 2004

(54) SUCTION HOSE ARRANGEMENT FOR REFUSE TANK TRUCKS

(75) Inventors: Michael C. Greene, Youngsville, NC (US); Bernie Jon Bossom, Streator, IL (US)

(73) Assignee: Vactor Manufacturing, Streator, IL (US)

( * ) Notice: Subject to any disclaimer, the term of this patent is extended or adjusted under 35 U.S.C. 154(b) by 327 days.

(21) Appl. No.: 10/083,388

(22) Filed: Feb. 27, 2002

(51) Int. Cl.$^7$ .............................. B08B 9/04; B60P 1/60; B60P 3/22
(52) U.S. Cl. ...................... 15/340.1; 280/838; 406/39
(58) Field of Search ................ 15/302, 304, 340.1, 15/347; 280/837–839; 406/39–41, 43, 44

(56) References Cited

U.S. PATENT DOCUMENTS

| | | |
|---|---|---|
| 3,348,258 A | 10/1967 | Daneman |
| 3,506,998 A | 4/1970 | Perry |
| 3,658,589 A | 4/1972 | Shaddock |
| 3,819,069 A | 6/1974 | Bauman et al. |
| 3,870,489 A * | 3/1975 | Shaddock ................... 55/314 |
| 4,019,219 A | 4/1977 | Willenborg |
| 4,134,171 A * | 1/1979 | Love ............................. 15/146 |
| 4,199,837 A | 4/1980 | Fisco, Jr. |
| 4,446,591 A * | 5/1984 | Wiedemann ................. 15/315 |
| 4,525,277 A | 6/1985 | Poulin |
| 4,659,262 A | 4/1987 | van Aalst |
| 4,669,145 A | 6/1987 | Kehr |
| 4,935,984 A | 6/1990 | Bryant et al. |
| 4,995,138 A | 2/1991 | Pullen |
| 5,030,259 A * | 7/1991 | Bryant et al. ................ 55/302 |
| 5,062,868 A * | 11/1991 | Kennedy ..................... 95/268 |
| 5,577,772 A | 11/1996 | Kaiser |
| 6,438,792 B1 * | 8/2002 | Cappellotto ................ 15/315 |

FOREIGN PATENT DOCUMENTS

| | | | |
|---|---|---|---|
| DE | 195 12 115 | * | 10/1996 |
| EP | 0 829 585 | * | 7/1997 |

* cited by examiner

*Primary Examiner*—Terrence R. Till
(74) *Attorney, Agent, or Firm*—Finnegan, Henderson, Farabow, Garrett & Dunner, L.L.P.

(57) ABSTRACT

A tank truck for collecting and transporting flowable material, the tank truck including a tank for storing flowable material and a suction hose connected to the tank so that at least a portion of the suction hose extends into the tank. A drive assembly engageable with the suction hose is provided for drawing the suction hose into and out of the tank, thereby varying the length of the suction hose outside the tank. The boom preferably includes a boom tube through which the suction hose extends. Also an extendable nozzle assembly may be attached to an end of the suction hose outside the tank. The drive assembly may take various forms and may be supported on the end of the boom. A combination of movement of the suction hose into and out of the tank, in combination with the extendable nozzle assembly, varies the effective length of the suction hose outside the tank.

33 Claims, 13 Drawing Sheets

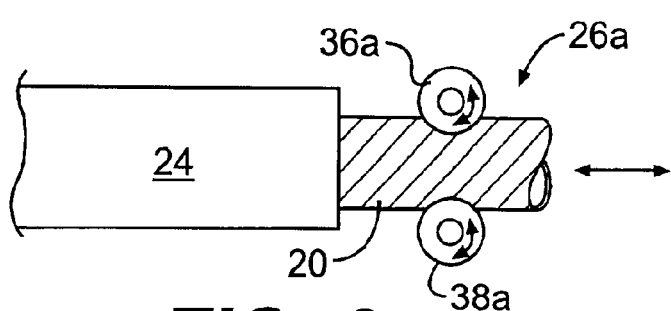
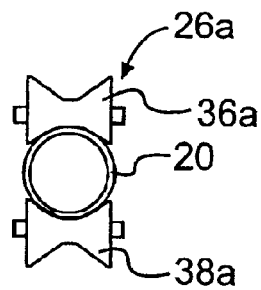
FIG. 6       FIG. 7
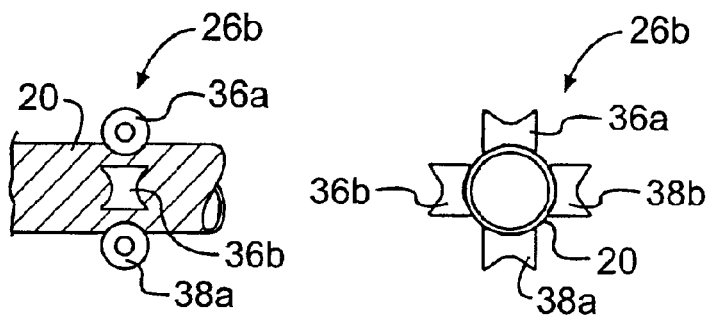
FIG. 8A       FIG. 8B
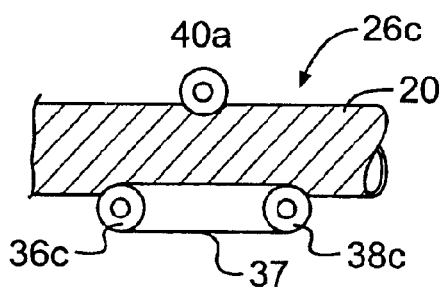
FIG. 9

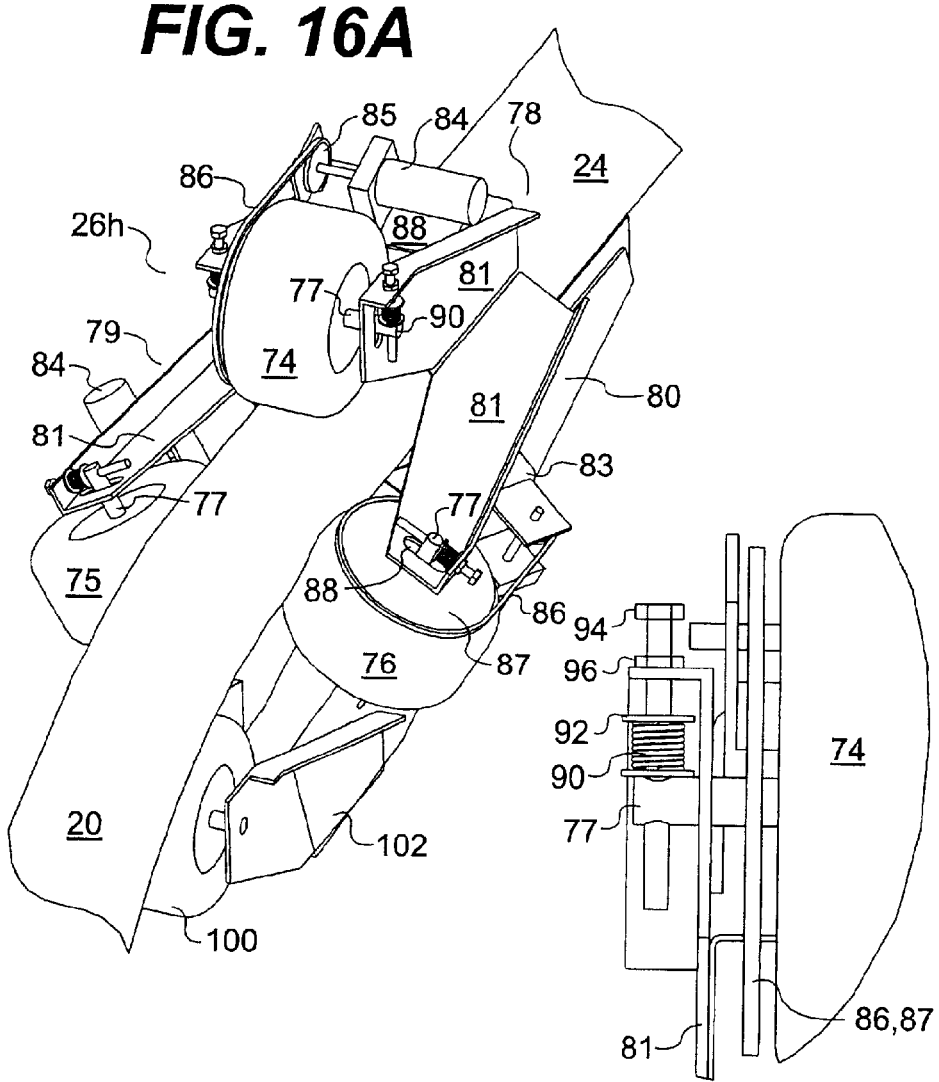
FIG. 16A
FIG. 17
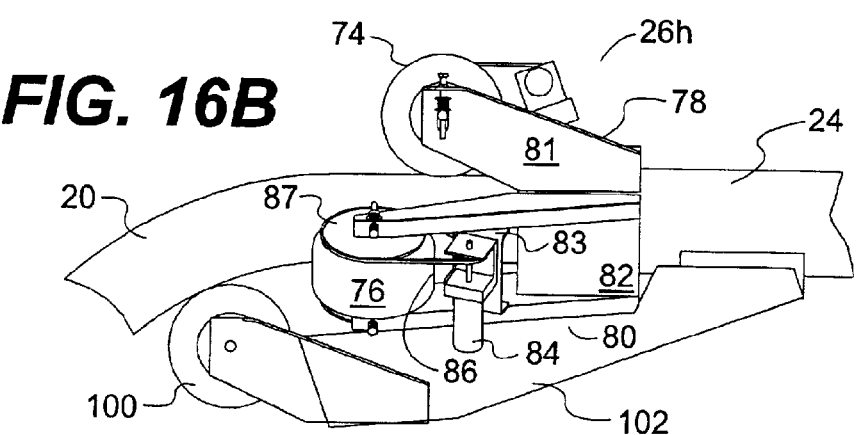
FIG. 16B

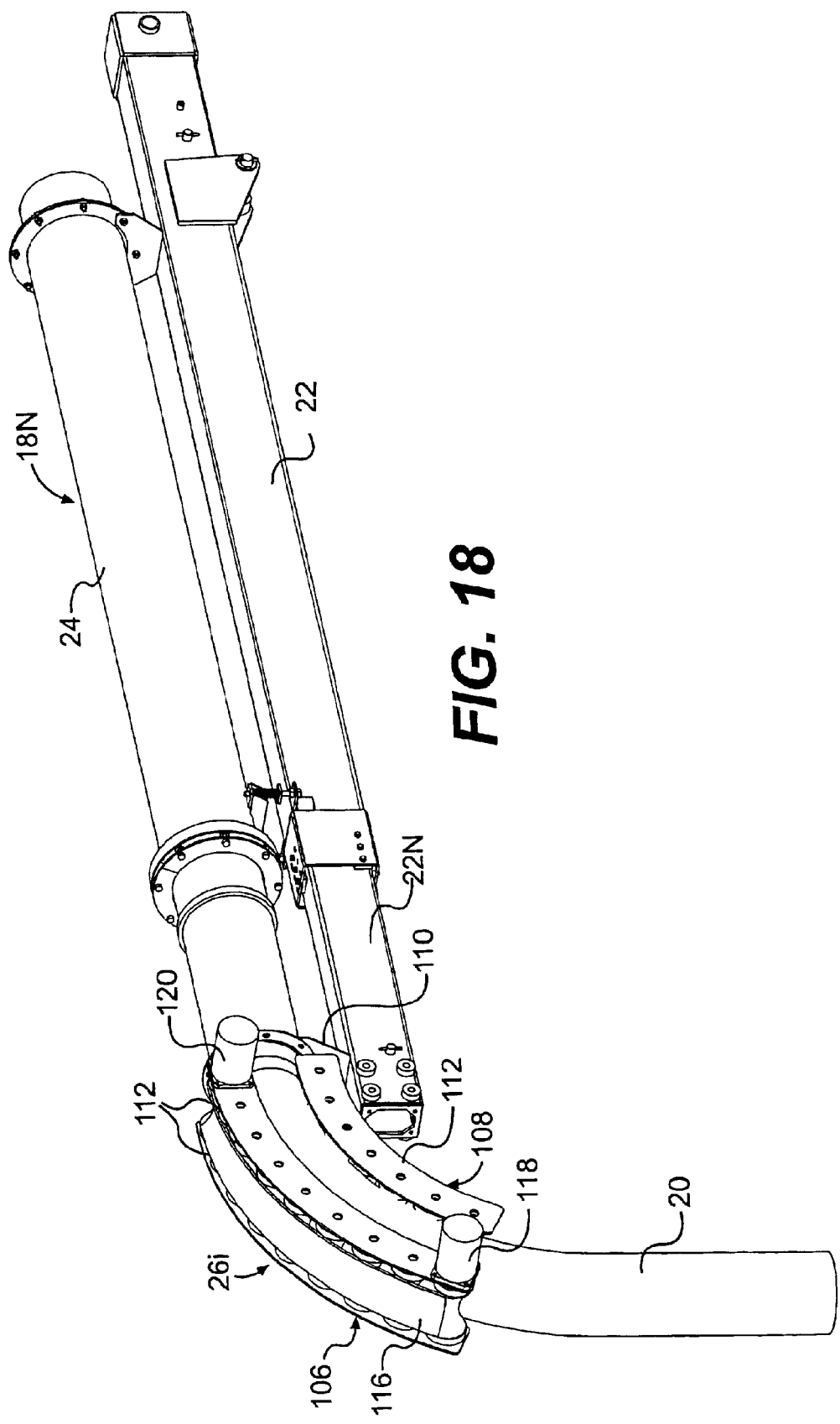

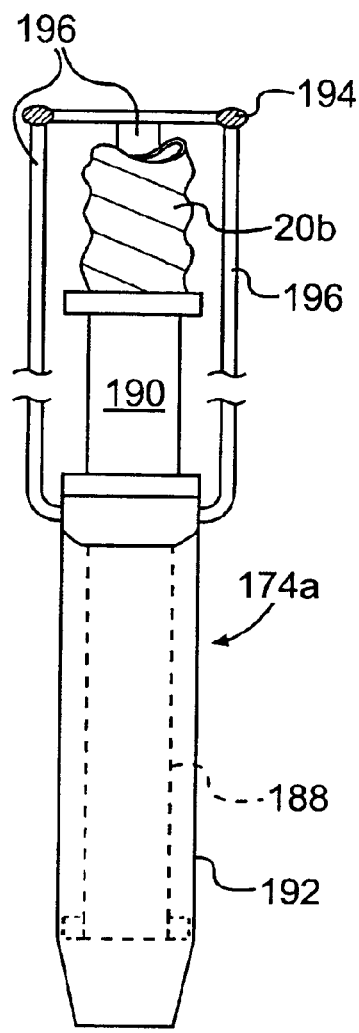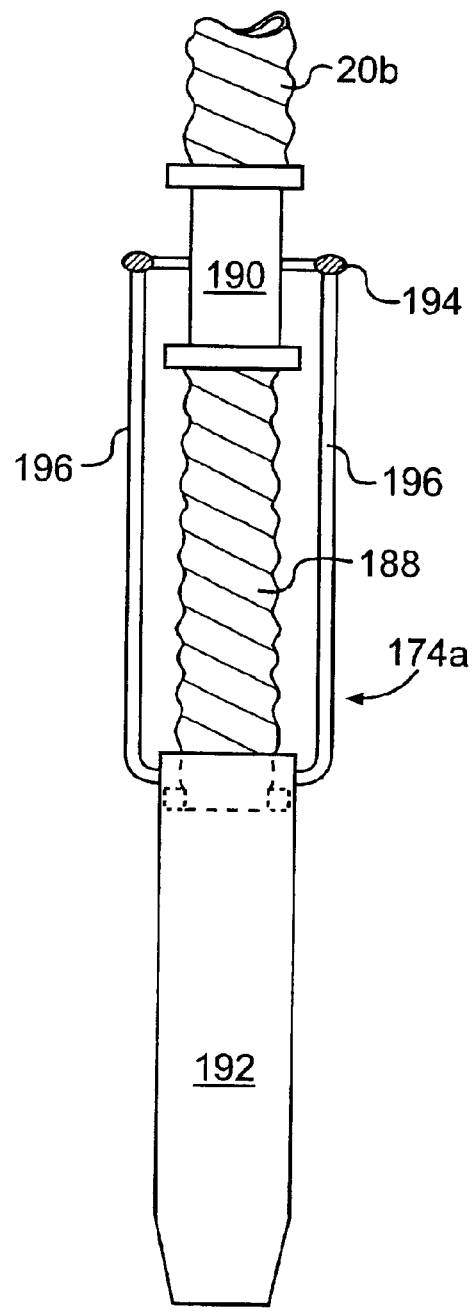
FIG. 23
FIG. 24

SUCTION HOSE ARRANGEMENT FOR REFUSE TANK TRUCKS

BACKGROUND OF THE INVENTION

1. Field of the Invention

The present invention relates to tank trucks for collecting and transporting flowable refuse material, and, more particularly, to a suction hose handling and storage arrangement for such tank trucks.

2. Description of the Related Art

Tank trucks for collecting and transporting flowable refuse materials, such as storm drain sewage, septic tank sewage, leaves and the like, are typically equipped with a storage tank, a vacuum pump, and an at least partially flexible suction hose connected to a tank at one end and having a refuse pick-up nozzle at the opposite or distal end thereof. The suction hose may be supported by an adjustable boom on the truck so that at a site of refuse pick-up, the nozzle may be manipulated and positioned relative to the parked truck. Although the distance between the truck and the position of the nozzle at the pick-up site is not large at most pick-up sites, some measure of suction hose length adjustability between the tank and the pick-up nozzle is needed.

In the past, various devices have been used to accommodate the limited but needed variable length of the pick-up suction hose associated with such tank trucks. For example, extensible suction hoses, a suction hose storage reel between the nozzle and the tank, or insertable suction hose sections have been employed. Because of the relatively large diameter of the suction hose, all of these devices present problems to efficient operation of the tank truck, use of the space available on the tank truck, and maintenance and/or replacement of the suction hose.

Accordingly, there is a need for improvement in refuse collecting and transporting tank trucks and, in particular, the provision of an improved arrangement for adjusting the length of the suction hose between the tank of such trucks and pick-up nozzle on the distal end of the suction hose.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention is directed to a tank truck for collecting and transporting flowable material. The tank truck includes a tank for storing flowable material and a suction hose connected to the tank so that at least a portion of the suction hose extends into the tank. A drive assembly engageable with the suction hose is provided for drawing the suction hose into and out of the tank, thereby varying the length of the suction hose outside the tank.

In another aspect, the advantages and purpose of the invention are attained by such a tank truck including a tank for storing a flowable material, a boom including a boom tube mounted on the truck, a suction hose connected to the tank and extending through the boom tube, at least a portion of the suction hose also extending into the tank, and an extendable nozzle assembly attached to an end of the suction hose outside the tank. A drive assembly is engageable with the suction hose for drawing the suction hose into and out of the tank and, in combination with the extendable nozzle assembly, varies the effective length of the suction hose outside the tank.

It is to be understood that both the foregoing general description and the following detailed description are exemplary and explanatory only and are not restrictive of the invention, as claimed.

BRIEF DESCRIPTION OF THE DRAWINGS

The accompanying drawings, that are incorporated in and constitute a part of this specification, illustrate several embodiments of the invention and together with the description, serve to explain the principles of the invention.

FIG. 6 is a fragmentary side elevation illustrating a variant of the suction hose driving assembly of the present invention;

FIG. 7 is an end view taken from the right side of FIG. 6;

FIGS. 8a and 8b are schematic views illustrating an alternative embodiment of the suction hose driving assembly;

FIG. 9 is a schematic view illustrating a further suction hose drive assembly;

FIG. 16A is a fragmentary perspective view illustrating another alternative suction hose drive embodiment of the invention;

FIG. 16B is a fragmentary side view of the embodiment of FIG. 16A;

FIG. 17 is a fragmentary end view of a drive tire in the embodiment of FIG. 16A;

FIG. 18 is a perspective view illustrating still another alternative suction hose drive embodiment of the invention;

FIG. 23 is a fragmentary elevation illustrating an alternative nozzle extension/retraction device of the present invention; and FIG. 24 is a similar elevation showing the device of FIG. 23 in a different operating position.

DESCRIPTION OF THE PREFERRED EMBODIMENTS

Figure 1:
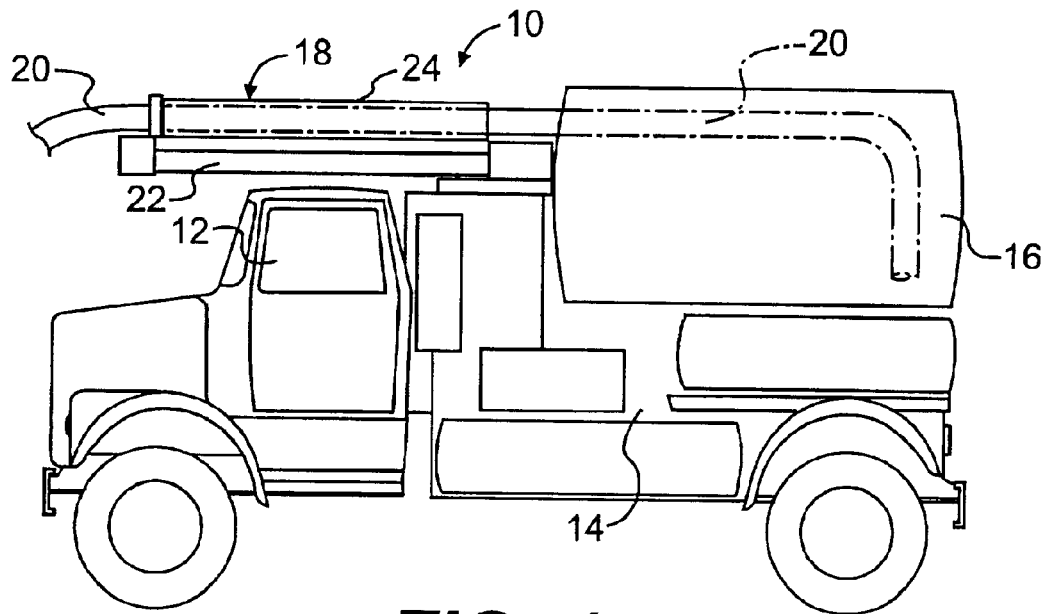
FIG. 1 is a schematic side elevation illustrating a preferred embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts.

In accordance with the present invention, a tank truck for transporting flowable material is provided with a tank for storing the flowable material, a suction hose connected to the tank, at least a portion of the suction hose extending into the tank, and a drive assembly in engagement with the suction hose for drawing the suction hose into and out of the tank, thereby varying the length of the suction hose outside the tank.

In the embodiment illustrated in FIGS. 1–5, a tank truck, generally designated by the reference number 10, is shown to include a conventional cab 12 and a truck body 14 supporting a refuse tank 16, a boom 18, a suction hose 20, and assorted equipment for operating the boom 18, for subjecting the tank 16 to a negative pressure or vacuum, and in general, for complete operation of the tank truck 10 for sewer cleaning, storm drain cleaning, other types of catch basin cleaning, leaf collection, litter collection, hydroexcavation, industrial vacuum cleaning, and other pneumatic conveying applications. Since much of the assorted equipment is conventional, the ensuing description will be limited to components of equipment on the truck 10 that are relevant to the practice of the present invention.

Figure 2:
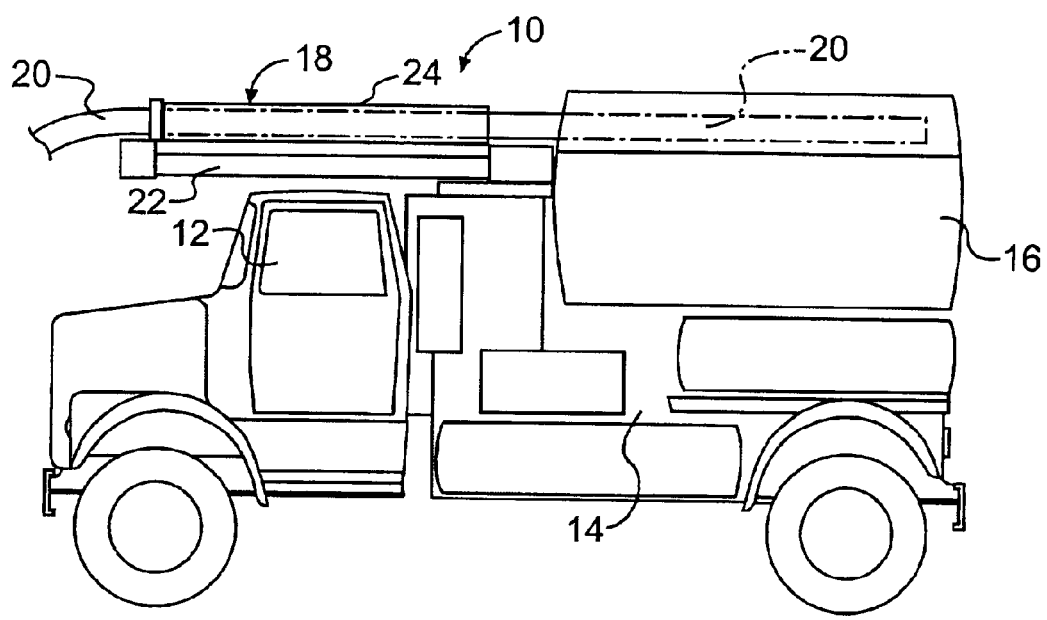
FIG. 2 is a similar side elevation illustrating a variant of the embodiment illustrated in FIG. 1.

The boom 18 includes a bottom support beam 22, pivoted on top of the truck body 14 for horizontal swinging movement over the truck cab 12, and an overlying, open-ended boom tube 24 fixed to the beam 22. The suction hose 20 extends slidably throughout the length of the boom tube 24 and through the front end of the refuse tank 16 to enable suction hose storage within the tank 16, both before and after the tank 16 is filled. The length of the suction hose 20 that may be stored in the tank 16 may be limited to the length of the tank 16, as shown in FIG. 2, or may exceed the length of the tank 16 as shown in FIG. 1. The length of the suction hose that may be thus stored in the refuse tank 16 after the tank is filled will depend in some measure on the extent to which the tank is filled and the characteristics of the refuse with which it is filled. For example, when the stored refuse is liquid or largely liquid, the stored suction hose length is limited only by the residual empty volume in the tank after filling because the suction hose can be submerged in the liquid refuse after the tank is filled, as represented by FIG. 1. On the other hand, when the tank 16 is loaded with largely solid materials, such as trash or leaves, space available for suction hose storage may be limited to that space overlying the refuse filling the tank, as represented in FIG. 2.

Figure 3:
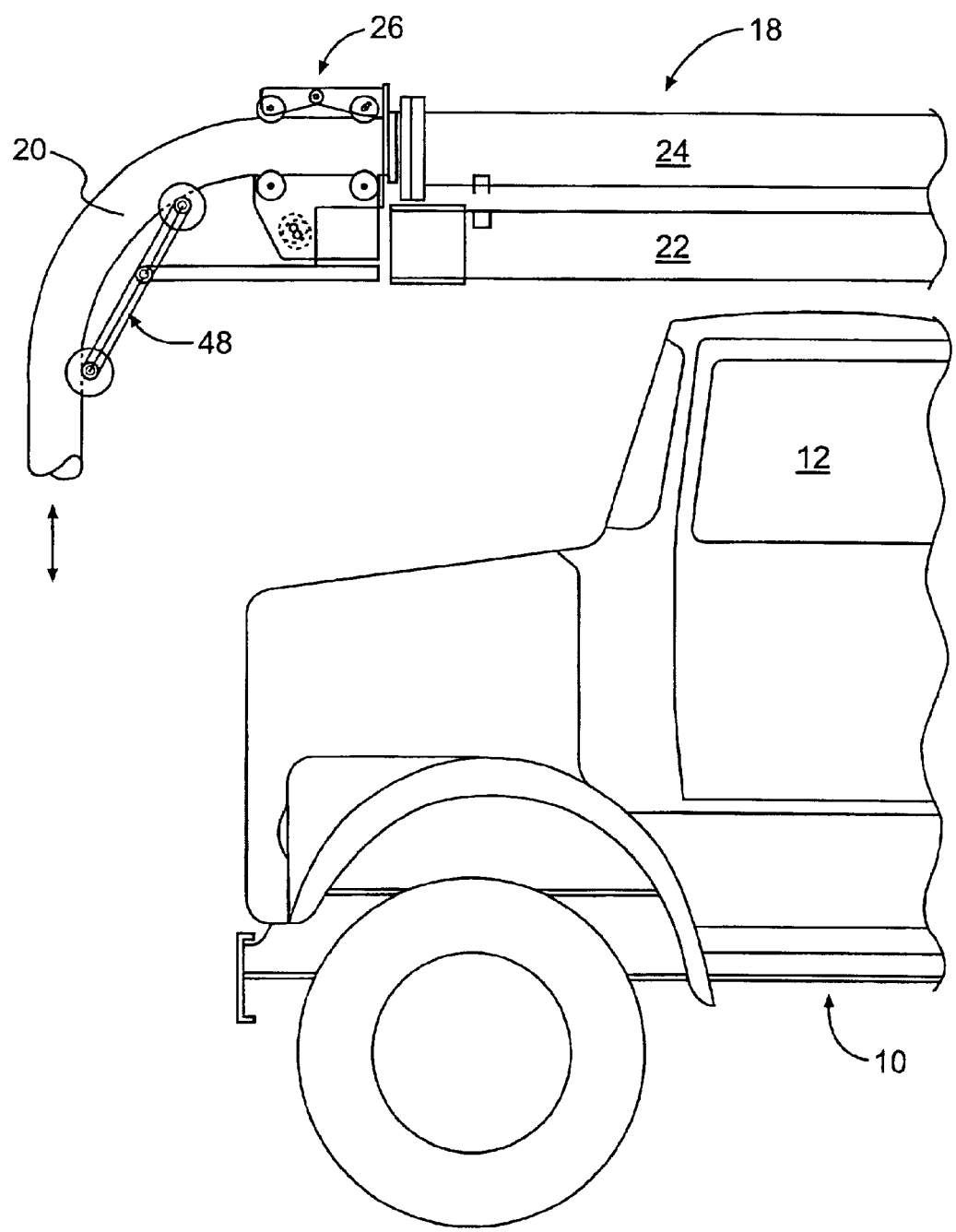
FIG. 3 is a fragmentary side elevation illustrating an exemplary embodiment of a suction hose support and drive assembly of the present invention.
Figure 5:
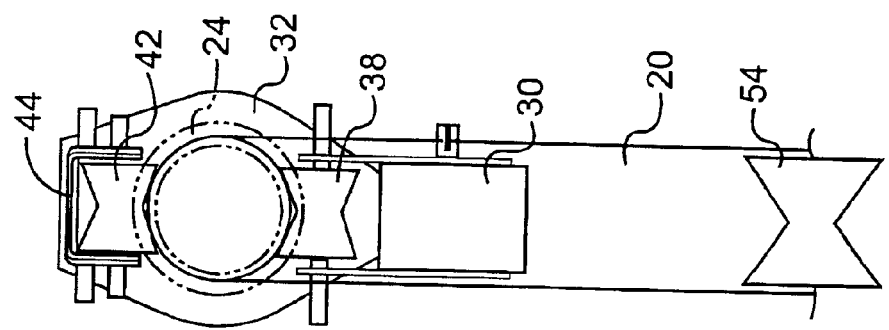
FIG. 5 is an end view of the components shown in FIG. 4 as viewed on line 5—5 of FIG. 4.
Figure 4:
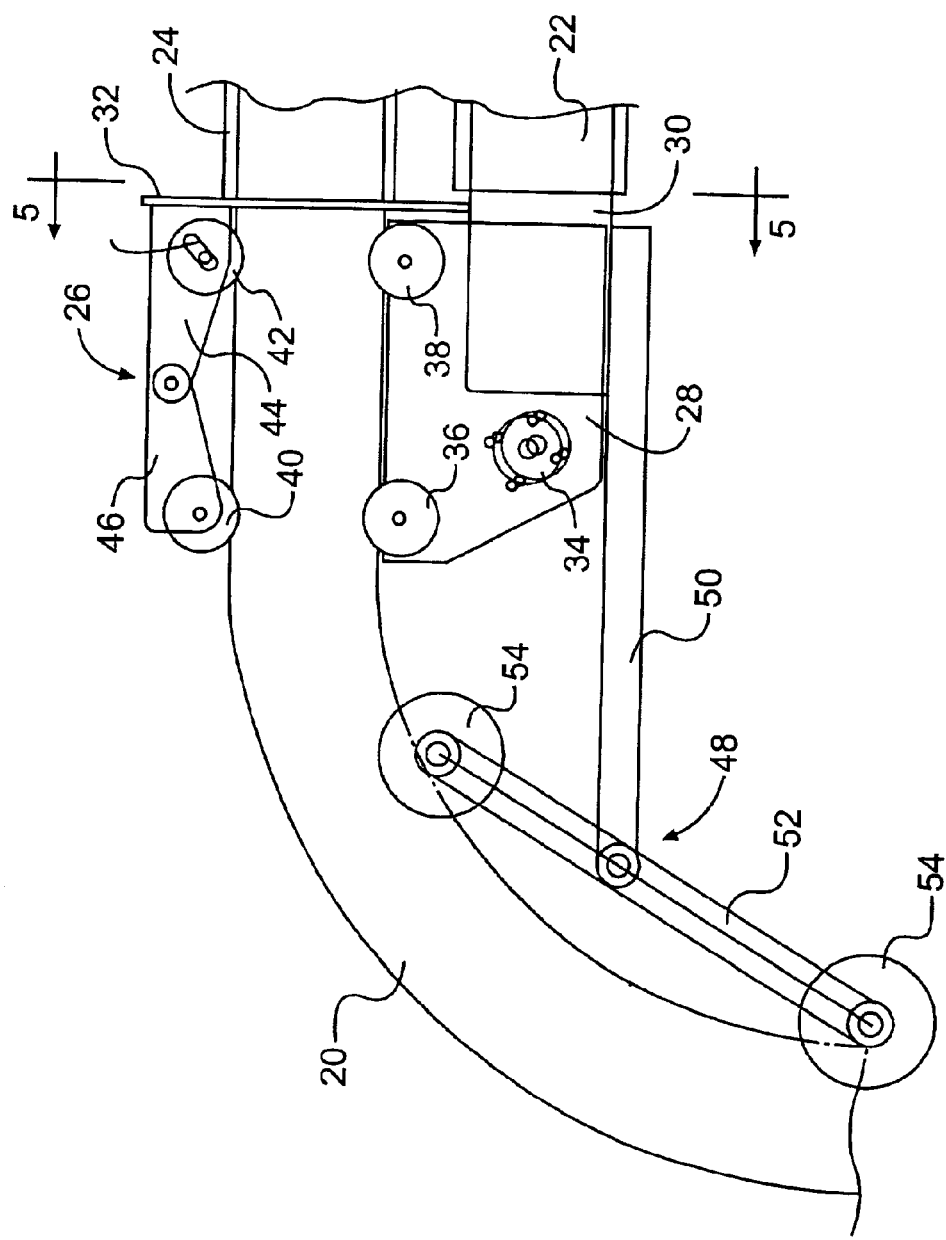
FIG. 4 is an enlarged fragmentary side elevation illustrating the suction hose supporting and drive assembly of FIG. 3 in more detail.

As shown generally in FIG. 3, and in more detail in FIGS. 4 and 5, a suction hose drive assembly 26 is supported on the front end of the boom 18 to extend and retract the suction hose 20 from and into the tank 16 through the boom tube 24, thereby adjusting the length of the suction hose 20 available to accommodate varying distances between the truck 10 and a point of refuse pickup. The drive assembly includes a housing 28 secured by an extension 30 to the front end of the beam 22 and by flange 32 to the end of the boom tube 24. A drive motor 34 in the housing 28 is connected by a transmission mechanism (not shown) to a pair of drive rollers 36 and 38 of concave, biconical configuration to enhance frictional contact with the suction hose 20. Such frictional contact is further enhanced by a pair of spring biased idling rollers 40 and 42. As shown in FIGS. 4 and 5, the idling roller 42 is supported for movement under a spring bias within an inclined slot 43 in a channel shaped arm 44 cantilevered from the flange 32. The idling roller 40 is supported on a spring biased arm 46 pivoted to the front end of the arm 44.

Also, the embodiment illustrated in FIGS. 1–5 includes a self adjusting hose guide 48 to prevent hose kinking and binding. As shown most clearly in FIG. 4, the hose guide 48 includes a support strut 50 welded or otherwise suitably secured to the beam extension 30 under the housing 28, a freely pivotal arm 52 at the front end of the strut 50, and a pair of guide rollers 54.

In FIGS. 6–20 of the drawings, alternative drive assemblies 26a–26i, for extending and retracting the hose 20, are illustrated. In FIGS. 6 and 7, a drive assembly 26a is shown schematically to include a pair of drive rollers 36a and 38a, which are provided on diametrically opposite sides of the hose 20. In FIGS. 8a and 8b, additional diametrically opposite rollers 36b and 38b are provided in a drive assembly 26b to increase friction against the hose 20. In FIG. 9, a further alternative drive assembly 26c includes an endless belt trained around driver rollers 36c and 38c, whereas the hose 20 is biased against the belt by an idler roller 40a.

Figure 10:
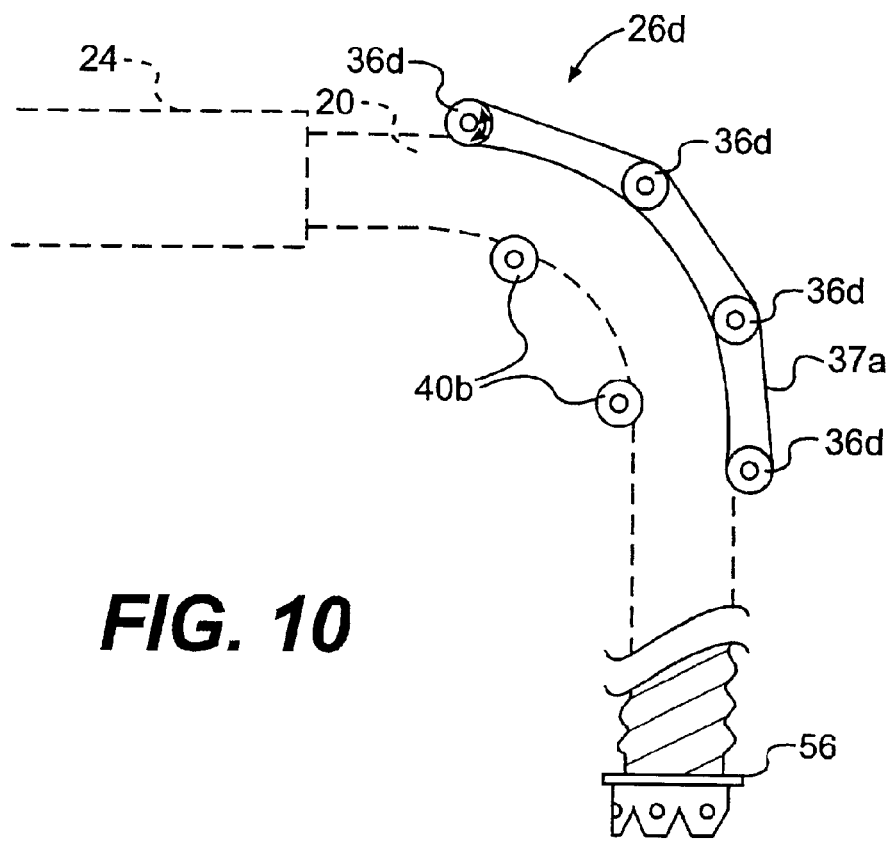
FIG. 10 is a schematic side view illustrating a still further alternative embodiment of a suction hose drive assembly.

In FIG. 10, another alternative drive assembly 26d is shown schematically to include an endless rubber belt 37a, trained about a plurality of rollers 36d arranged to cause the belt 37a to travel in an arcuate flight path. At least one of the rollers 36d is reversibly driven by a power source (not shown). A pair of idler rollers 40b retain the suction hose 20 against the belt 37a, which may be smooth, ribbed or cogged, as required. A flange 56 at the distal end of the suction hose 20 limits retracting movement of the hose. Also, the drive assembly 26d makes use of the tendency of the suction hose 20 to straighten, and does not require springs to maintain firm contact between the hose 20 and the belt 37a.

Figure 11:
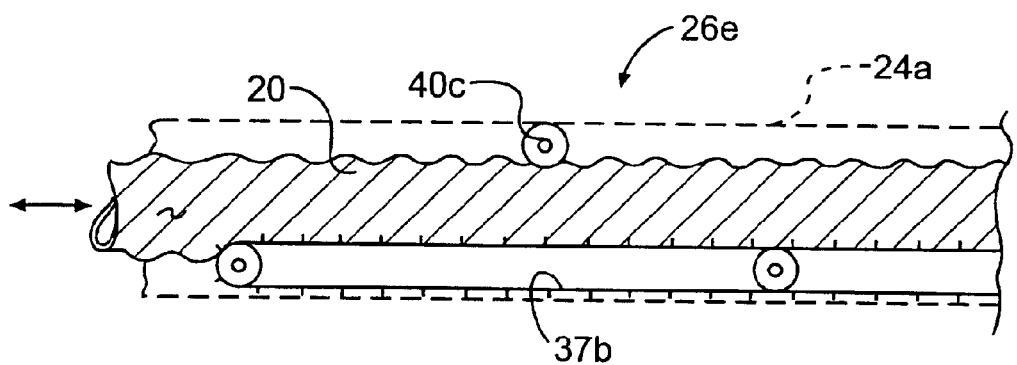
FIG. 11 is a schematic view depicting yet another embodiment of the suction hose drive assembly of the present invention.

In FIG. 11 an alternative drive assembly 26e is shown schematically to include a cogged belt 37b inside the boom tube 24a, which is enlarged to accommodate the belt 37b and one or more pressure rollers 40c, as illustrated.

Figure 12:
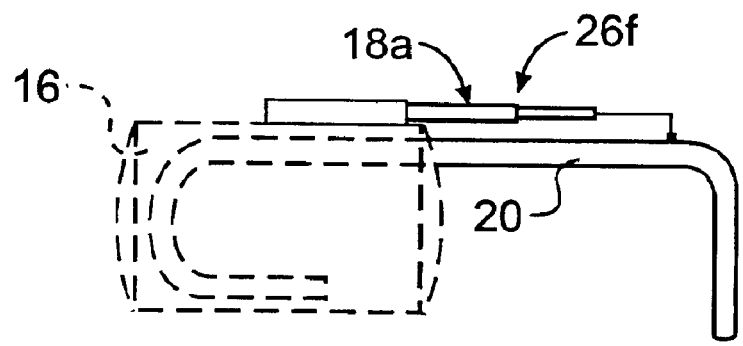
FIG. 12 is a schematic side elevation illustrating a variation of a supporting boom for the suction hose.

In FIG. 12, a still further alternative drive assembly 26f is shown schematically, in which the suction hose 20 is attached to a telescopic boom 18a that may be extended and retracted hydraulically, for example.

Figure 13:
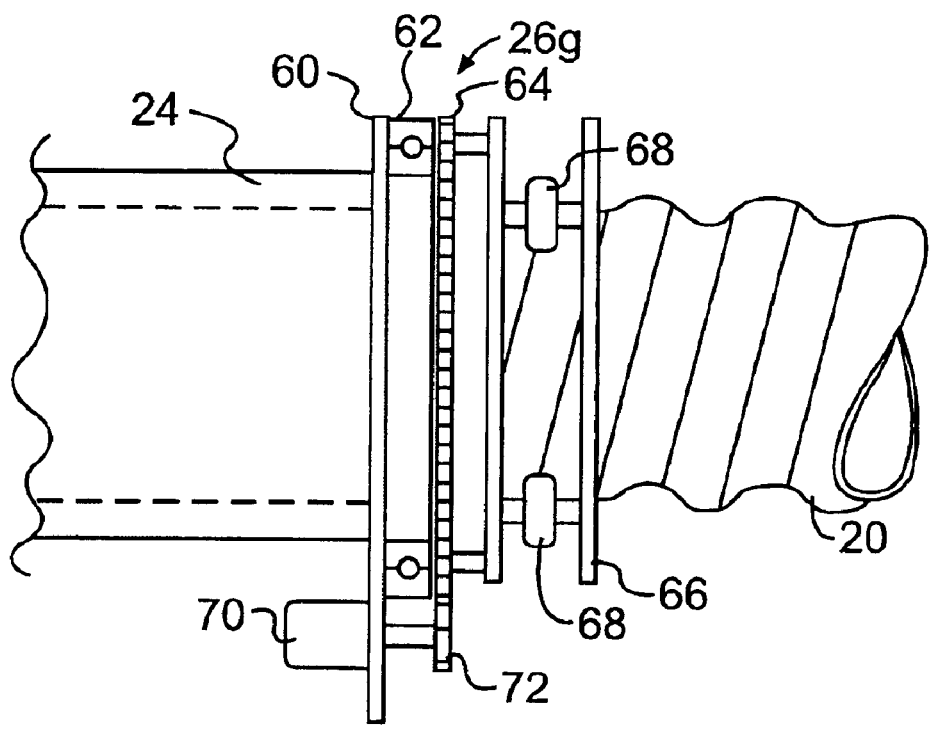
FIG. 13 is a plan view illustrating a suction hose drive assembly for a tubular boom in accordance with the present invention.
Figure 15:
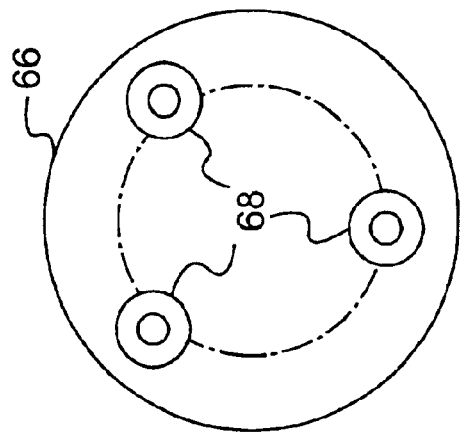
FIG. 15 is an end view of the drive assembly shown in FIG. 14.
Figure 14:
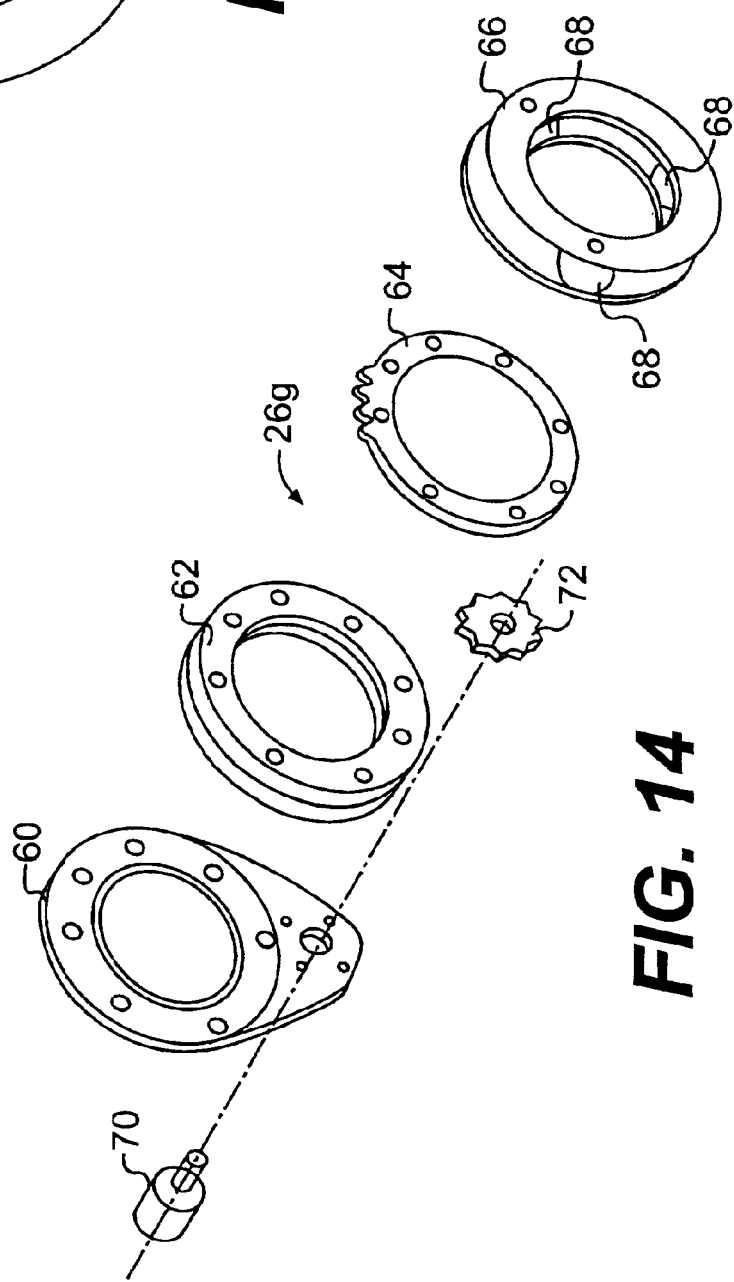
FIG. 14 is an exploded perspective view illustrating the components of the drive assembly shown in FIG. 13.

An alternative drive assembly 26g is shown in FIGS. 13–15, and which makes use of helical corrugations on the outside of the suction hose 20. As shown in FIG. 13, the drive assembly is supported by a flange 60 welded or otherwise secured through the front end of the boom tube 24. The drive assembly is formed by axially aligned components, including an annular bearing 62 secured on one side to the flange 60, and on its other side, an annular gear 64. The gear 64, in turn, is connected to an annular carriage 66 for at least two, preferably three symmetrically oriented wheels 68. In place of the carriage 66 and wheels 68, a ball screw (not shown) could be substituted and in which, a plurality of balls are retained by a sleeve in a helical pattern complementing the helical corrugations on the outside of the suction hose 20. A motor 70, supported by the flange 60 reversibly drives a pinion gear 72 in mesh with the annular ring gear 64 to rotate the carriage 66 reversibly in opposite directions.

In the drive assembly 26g, the wheels 68 may be pitched to engage in a helical groove on the exterior of the suction hose 20. In that manner, the rotation of the carriage 66, and the wheels 68 will advance the suction hose axially, relatively to the flange 60 in either an extended or retracted direction, depending on the direction in which the motor 70 is rotated.

In FIGS. 16A–17, a suction hose drive 26h is shown to include inflatable, pneumatic tires 74, 75, and 76 on wheels journalled on axle pins 77 supported in respective brackets 78, 79, and 80 secured to the boom tube 24. Each of the brackets 78, 79, and 80 is similarly constructed to include a pair of side plates 81 extending from an arcuate base 82 welded or otherwise suitably secured to the boom tube 24. As shown in FIG. 16B, a channel-shaped motor bracket 83 is fixed between the side plates 81 of each bracket 78, 79, and 80, and mounts a motor 84 having a drive shaft and sprocket 85. A drive belt or chain 86 is trained about, and thus connected between the motor drive shaft and sprocket 85 and a driven sprocket 87 affixed to the wheel of each of the tires 74, 75, and 76, respectively. Thus, each of the respective tires 74, 75, and 76 is connected to a reversible motor 84 mounted on each bracket, 78, 79, and 80, respectively, so that operation of the motors 84, which may be hydraulic, electric, or air motors, supplies drive torque to the respective tires 74, 75, and 76.

The tires 74, 75, and 76, which engage and drive the hose 20 along its length, are preferably pliant elastomeric tires that have an aspect ratio to provide a width greater than the radial height of each tire. Such an aspect ratio enables the peripheral surface of each tire to wrap slightly about the cylindrical hose. Also, the normal force developed by the tires against the hose may be adjusted by varying the inflation pressure of the respective tires 74, 75, and 76. It is preferred, however, that each tire 74–76 is biased against the suction hose 20 under an adjustable spring bias.

As shown most clearly in FIGS. 16A and 17, the axle pins 77 of each of the tires 74–76 extend at opposite ends through slots 88 that extend in a radial direction relative to the suction hose 20. As a result, the tires 74–76 may move in the direction of the slots 88, or radially relative to the suction hose 20. Each of the opposite ends of the axle pin 77 of each tire 74–76 is biased toward the suction hose 20 by a compression spring 90 seated at one end against the axle pin 77, and, at its other end, against a collar 92 secured to a bolt 94 threaded in a nut 96 anchored to a top flange of side plate 81. Thus, the bias of the compression springs 90 at opposite ends of each axle pin 77 may be adjusted to obtain a proper normal force by which the respective tires 74–76 are urged against the suction hose 20.

As may be seen most clearly in FIG. 16A, the tires 74, 75, and 76 are supported by their respective brackets 78, 79, and 80 to be symmetrically positioned about the hose 20 at angular intervals of 120° such that the tire 74 is positioned on top of the hose 20, and the drive tires 75 and 76 are positioned to engage the bottom half of the hose 20 as it is fed through the boom tube 24. Also, in FIG. 16B, it will be seen that the bracket 78 of the top tire 74 is shorter in length than the brackets 79 and 80 supporting the tires 75 and 76, so that the lower tires 75 and 76 are positioned slightly forward of the top tire 74. As a result of this offset between the top tire 74 and the lower tires 75 and 76, a measure of support against downward bending of the hose is provided as it is driven by the respective tires 74, 75, and 76. In addition, an idling hose support tire 100 is supported on the end of an elongated bracket 102 secured to the bottom of the boom tube 24 behind the brackets 78, 79, and 80. Thus, the relative longitudinal positioning of the roller 74 with respect to the lower rollers 75 and 76, together with the support roller 100, ensures that the hose 20 will be guided to a maximum extent as it passes from the boom 24 to a downwardly curved end portion.

Figure 19:
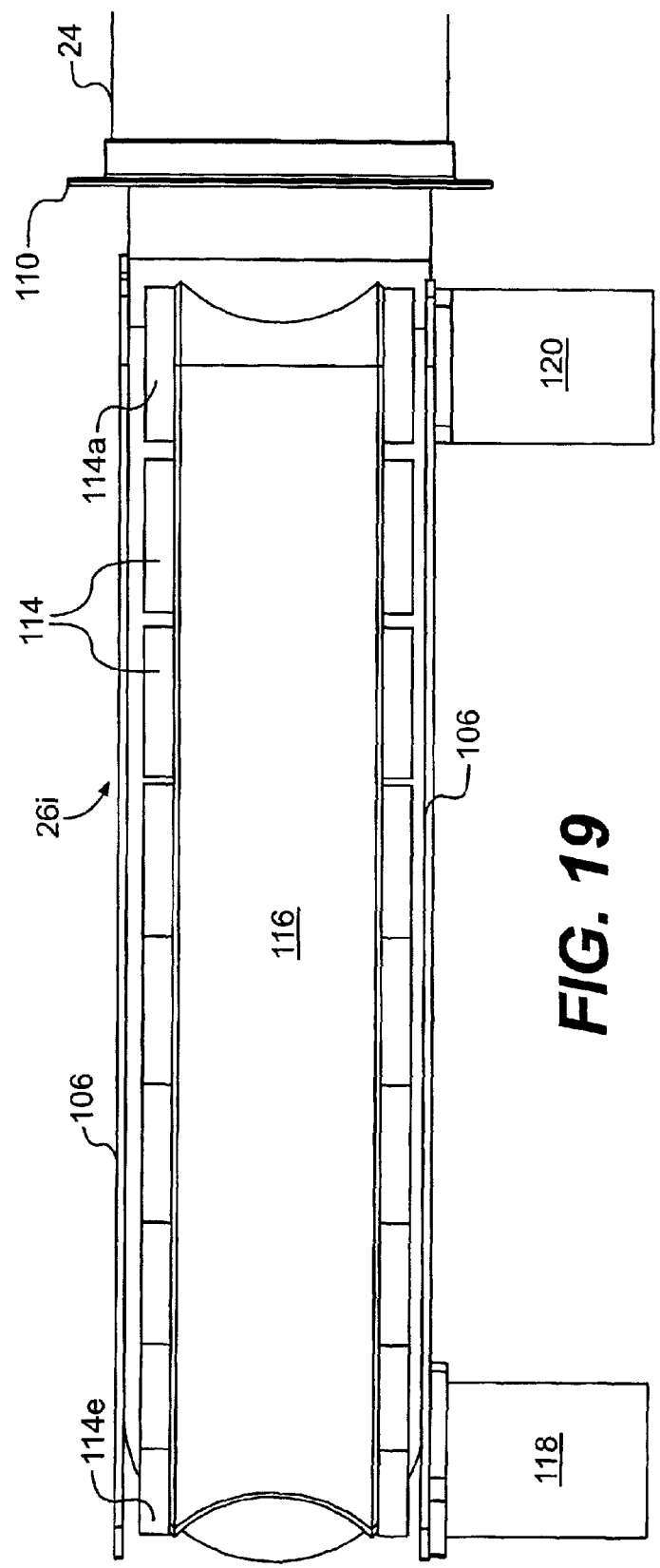
FIG. 19 is a fragmentary plan view of the embodiment of FIG. 18
Figure 20:
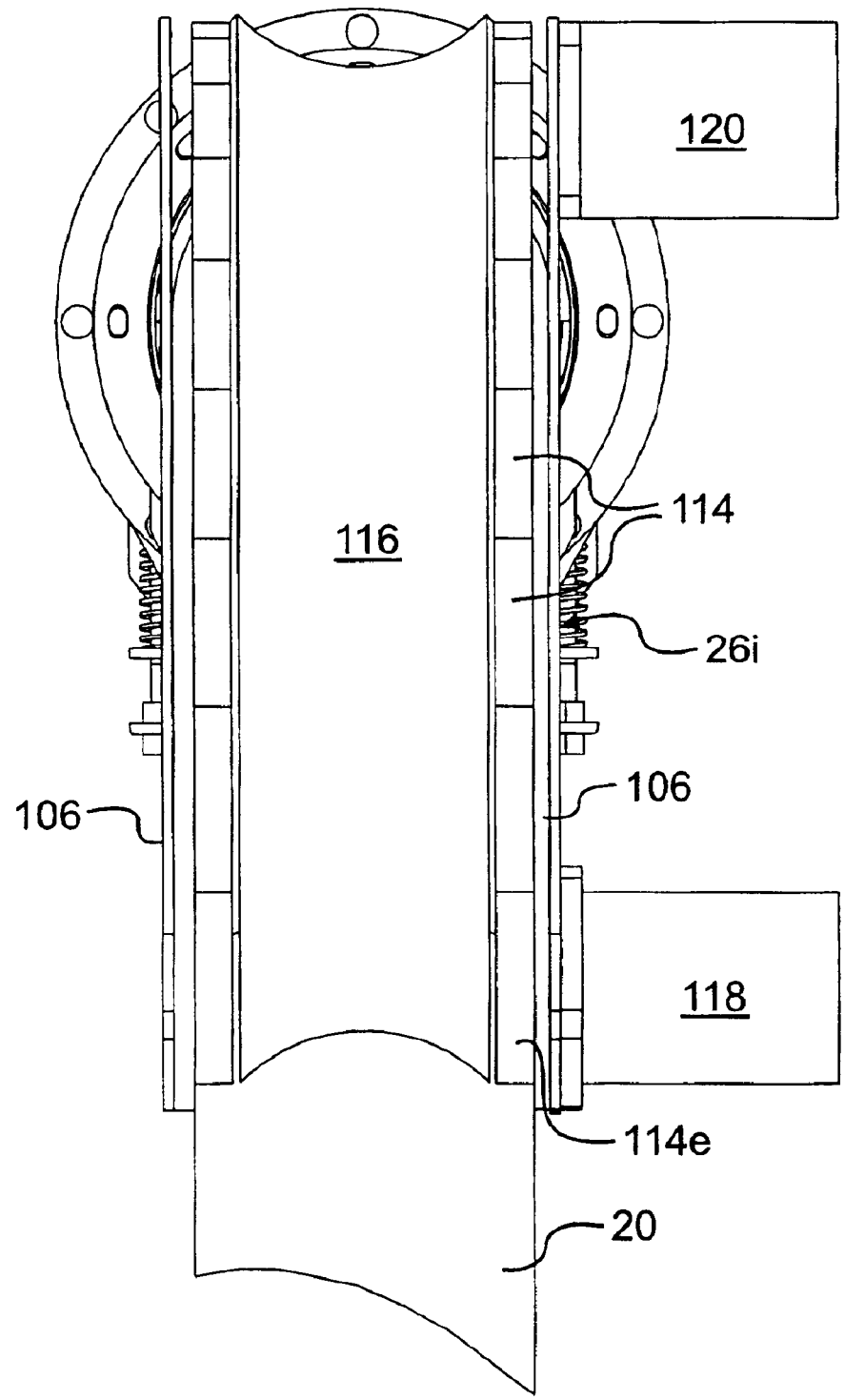
FIG. 20 is a fragmentary front view of the embodiment of FIG. 18

In FIGS. 18–20, a refinement of the suction hose drive 26d show in FIG. 10, is designated generally by the reference character 26i. The suction hose drive 26i of FIGS. 18–20 includes a pair of arcuate roller assemblies 106 and 108 that are cantilevered by an adapter 110 fixed to the front end of a telescopic extension 22n of the beam 22 of a boom 18n. The assemblies 106 and 108 are similar to each other in that both include a pair of spaced arcuate side members 112, fixed at their rear ends to the adapter 110, and projecting forwardly in a downwardly arcuate path. Also, both assemblies 106 and 108 include a plurality of axially concave rollers 114 journalled in the respective side members 112. The upper assembly 106, however, includes a flexible endless belt 116 trained about the rollers 114, whereas the rollers 114 of the assembly 112 directly engage the suction hose 20 as idling support rollers. The end rollers 114e of the upper assembly 106 are driven respectively by reversible motors 118 and 120. The motors may be either hydraulic motors, pneumatic motors, or electric motors which have an output or drive shaft directly connected to the respective end rollers, so that the belt 116 is driven at opposite ends.

In accordance with the present invention, an extendable nozzle assembly may be attached to an end of the suction hose outside the tank. A drive assembly is in frictional engagement with the suction hose for drawing the suction hose into and out of the tank and, in combination with the extendable nozzle assembly, varies the effective length of the suction hose outside the tank.

Figure 21:
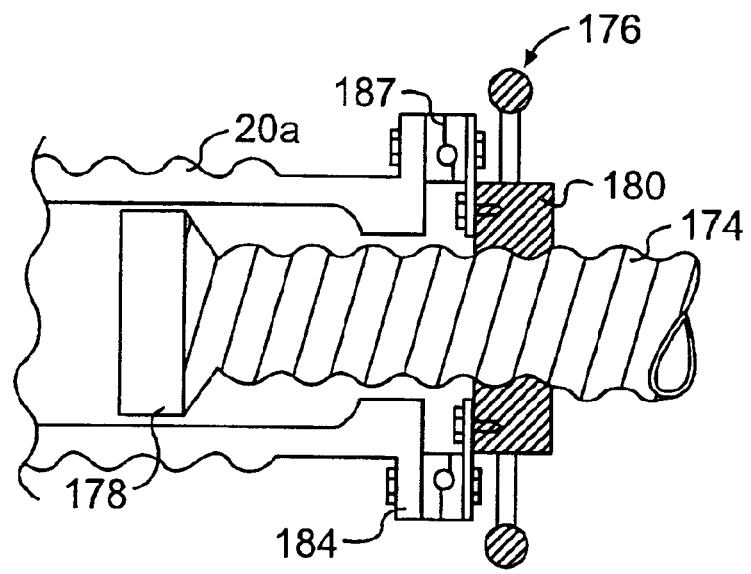
FIG. 21 is a fragmentary view illustrating an auxiliary suction hose drive assembly of the present invention.

In an embodiment of the invention illustrated in FIG. 21, a modified suction hose 20a, driven into and out of the tank 16 as described above, is combined with an extendable nozzle tube 174 and an auxiliary drive assembly 176. The nozzle tube 174 is formed with an enlarged sealing ring 178 on its end that extends into the suction hose 20a and has external helical corrugations along its length as shown. The auxiliary drive assembly 176 includes a hand wheel rotated block 180 threaded onto the external corrugations of the nozzle tube 174 and supported by a bearing 182 connected on one side to a flange 184 on the end of the suction hose 20a.

Figure 22:
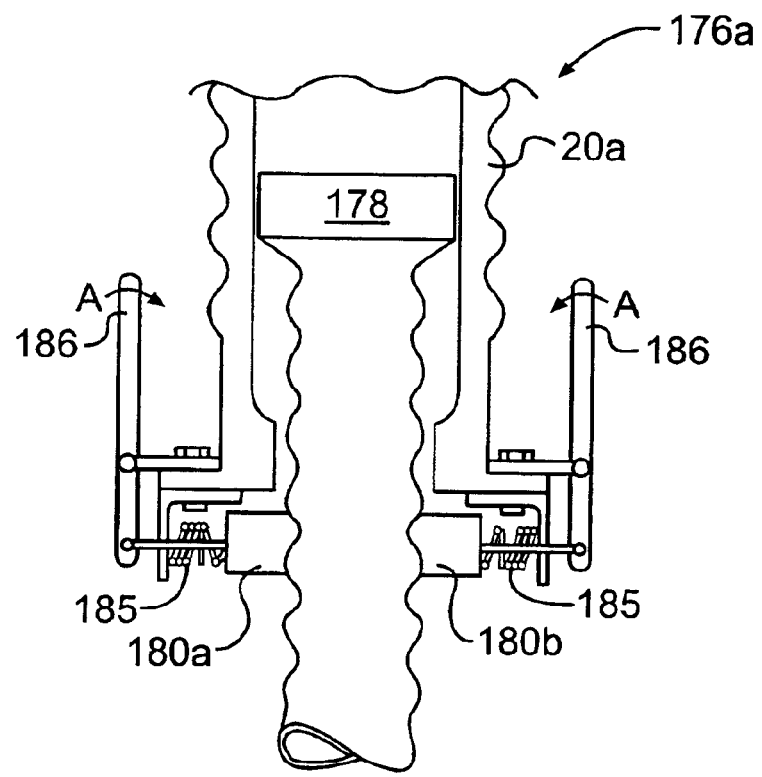
FIG. 22 is a variant of the drive assembly shown in FIG. 21.

A variation of the embodiment of FIG. 21 is shown in FIG. 22 and designated generally by the reference character 176a. As shown, the suction hose 20a is again provided with an end flange 184 on which a pair of manually operable lever arms 186 are mounted for pivotal movement from the position shown in the direction of the arrows A. The bottom ends of the lever arms 186 are connected to laterally separable hose clamping blocks 180a and 180b biased into engagement with the nozzle tube 174 by springs 185. In the clamping position shown, the nozzle tube 174 in retained against axial movement from the position to which it had been manually adjusted. When the lever arms 186 are moved toward each other against the bias of the springs 185, the clamping blocks 180a and 180b are retracted away from the nozzle tube 174 to permit further axial adjustment thereof to another position in which is retained be release of the lever arms 186.

In FIGS. 23 and 24, an alternative embodiment of an extendable nozzle tube 174a is shown to include an internal threaded or helically corrugated tube 188 secured to the distal end of the suction hose 20b by a coupling 190. An exterior nozzle 192 is threaded on the tube 188. A manually rotated hand wheel 194 is connected by depending struts 196 to the exterior nozzle 192 to facilitate rotation and corresponding axial positioning of the nozzle 192 relative to the end of the suction hose 20b. Elevation of the hand wheel 194 above the exterior nozzle 192 allows an operator to extend the exterior nozzle 192 substantially below the level of the operator to access refuse in a cistern, for example.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A tank truck for collecting and transporting flowable material, comprising:
   a tank for receiving and storing the flowable material;
   a suction hose connected to the tank, at least a portion of the suction hose extending into the tank; and
   a drive assembly engageable with the suction hose for drawing the suction hose into and out of the tank, thereby varying the length of the suction hose outside the tank.

2. A tank truck for collecting and transporting flowable material, comprising:
   a tank for receiving and storing the flowable material;
   a boom mounted on the truck;
   a suction hose connected to the tank and supported by the boom, at least a portion of the suction hose also extending into the tank; and
   a drive assembly engageable with the suction hose for drawing the suction hose into and out of the tank, thereby varying the length of the suction hose outside the tank.

3. The tank truck recited in claim 2, wherein the drive assembly comprises a drivable endless belt within the boom tube and engageable with an exterior peripheral portion of the suction hose, and means also located within the boom tube for retaining the suction hose in frictional contact with the endless belt.

4. A tank truck for collecting and transporting flowable material, comprising:
   a tank for receiving and storing the flowable material;
   a boom mounted on the truck and including a boom tube;
   a suction hose connected to the tank and extending through the boom tube, at least a portion of the suction hose also extending into the tank; and
   a drive assembly engageable with the suction hose for drawing the suction hose into and out of the tank, thereby varying the length of the suction hose outside the tank.

5. The tank truck recited in any one of claims 2 or 4, wherein the drive assembly is mounted on the boom.

6. The tank truck recited in claim 5, wherein the drive assembly comprises at least two rollers engageable with spaced exterior peripheral portions of the suction hose, at least on of the rollers being drivable.

7. The tank truck recited in claim 6, wherein the at least two rollers are engageable with opposite exterior sides of the suction hose.

8. The tank truck recited in claim 6, including four rollers engageable with equally spaced exterior peripheral portions of the suction hose.

9. The tank truck recited in claim 5, wherein the drive assembly comprises a drivable endless belt engageable with an exterior peripheral portion of the suction hose, and means for retaining the suction hose in frictional contact with the endless belt.

10. The tank truck recited in claim 9, wherein the means for retaining the suction hose in frictional contact with the endless belt comprises at least one spring biased roller engageable with the suction hose opposite the endless belt.

11. The tank truck recited in claim 9, wherein drivable endless belt is supported in an arcuate path to be engageable with an bent portion of the suction hose.

12. The tank truck recited in claim 11, wherein the means for retaining the suction hose in frictional contact with the endless belt comprises at least one roller engageable with the suction hose opposite the endless belt.

13. The tank truck of claim 9, wherein the drivable endless belt is supported by a plurality of rollers supported in an arcuate path, and including means for driving the rollers located at opposite ends of the arcuate path.

14. The tank truck of claim 13, wherein each of the plurality of rollers is of concave axial configuration and the endless belt is flexible to conform to the configuration of the rollers.

15. The tank truck of claim 13, wherein the drive assembly is supported on a telescopic extension of the boom.

16. The tank truck recited in claim 5, wherein the suction hose has external, helical corrugations, and wherein the drive assembly comprises a plurality of orbital wheels engageable with the helical corrugations, and means for driving the orbital wheels to advance or retract the suction hose.

17. The tank truck recited in claim 16 including an annular carriage for supporting the orbital wheels, and a drive motor for rotating the annular carriage.

18. The tank truck recited in claim 17 including an annular gear secured to the annular carriage, and a pinion gear in mesh with the annular gear and driven by the motor.

19. A tank truck for collecting and transporting flowable material, comprising:
   a tank for receiving and storing the flowable material;
   a boom mounted on the truck and having an adjustable length;
   a suction hose connected to the tank and supported by the boom, at least a portion of the suction hose also extending into the tank;
   whereby the suction hose is drawn and out of the tank to vary the length of the suction hose outside the tank by adjusting the length of the boom.

20. The tank truck recited in any one of claims 1–19 further comprising an extendable nozzle assembly on an end of the suction hose outside the tank.

21. The tank truck recited in claim 20, wherein the extendable nozzle assembly includes a nozzle tube, and means for adjusting length of the nozzle tube relative to the end of the suction hose.

22. The tank truck recited in claim 21, wherein the exterior of the nozzle tube is threaded, and the means for adjusting length of the nozzle tube relative to the end of the suction hose includes a manually rotatable block threaded onto the nozzle tube.

23. The tank truck recited in claim 21, wherein the means for adjusting length of the nozzle tube relative to the end of the suction hose comprises a pair of manually retractable clamping blocks for retaining the nozzle tube in an extended position.

24. The tank truck recited in claim 21, wherein the nozzle tube is threaded on the outside of a threaded interior tube, and the means for adjusting length of the nozzle tube relative to the end of the suction hose includes a manually rotatable hand wheel connected by depending struts to the nozzle tube.

25. A tank truck for collecting and transporting flowable material, comprising:
- a tank for receiving and storing the flowable material;
- a boom mounted on the truck and having a distal end;
- a suction hose supported from the boom, the suction hose being extendable from the distal end of the boom and retractable toward the tank;
- a drive assembly mounted on the boom and engageable with the suction hose for extending the suction hose past the distal end of the boom and retracting the suction hose toward the tank, thereby varying the length of the suction hose extended beyond the distal end of the boom; and
- a suction hose guide beyond the distal end of the boom, the suction hose guide including a strut having an end projecting beyond the distal end of the boom, a freely pivotal arm on the projecting end of the strut, and a pair of guide rollers mounted on the freely pivotal arm.

26. The tank truck of claim 25, wherein one of the guide rollers is mounted on each of opposite ends of the freely pivotal arm.

27. The tank truck of claim 26, wherein the freely pivotal arm is pivoted at a point between the opposite ends thereof.

28. A tank truck for collecting and transporting flowable material, comprising:
- a tank for receiving and storing the flowable material;
- a boom mounted on the truck and having a distal end;
- a suction hose supported from the boom, the suction hose being extendable from the distal end of the boom and retractable toward the tank; and
- a drive assembly mounted on the boom and engageable with the suction hose for extending the suction hose past the distal end of the boom and retracting the suction hose toward the tank, thereby varying the length of the suction hose extended beyond the distal end of the boom, the drive assembly comprising adjustably inflatable pneumatic tires positioned about the suction hose, and means for driving the tires in rotation to extend or retract the suction hose, suction hose extended beyond the distal end of the boom, the drive assembly comprising adjustably inflatable pneumatic tires positioned about the suction hose, and means for driving the tires in rotation to extend or retract the suction hose.

29. The tank truck of claim 28, wherein the drive assembly comprises three inflatable pneumatic tires positioned symmetrically about the suction hose, one of the three tires being located on top of the suction hose.

30. The tank truck of claim 29, wherein the one of the three tires located on top of the suction hose is positioned rearwardly of the other two of the three tires.

31. The tank truck of claim 30, including an idling support tire located under the tire and forwardly of the other two of the three tires.

32. The tank truck of claim 29, wherein a normal friction force of the tires against the suction hose is adjustable by inflation pressure of the tires.

33. The tank truck of claim 29, including spring means for developing a normal friction force of the tires against the suction hose.

* * * * *